(12) United States Patent
Fujino et al.

(10) Patent No.: US 7,088,570 B2
(45) Date of Patent: Aug. 8, 2006

(54) CARBONIZED PRODUCT USED FOR PRODUCTION OF ACTIVATED CARBON FOR ELECTRODE OF ELECTRIC DOUBLE-LAYER CAPACITOR

(75) Inventors: Takeshi Fujino, Saitama (JP); Shigeki Oyama, Saitama (JP); Minoru Noguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 109 days.

(21) Appl. No.: 10/183,047

(22) Filed: Jun. 27, 2002

(65) Prior Publication Data

US 2003/0026753 A1 Feb. 6, 2003

(30) Foreign Application Priority Data

Jun. 27, 2001 (JP) ............................. 2001-195313
Jun. 26, 2002 (JP) ............................. 2002-185701

(51) Int. Cl.
*H01G 9/00* (2006.01)
(52) U.S. Cl. ...................................... 361/502; 252/502
(58) Field of Classification Search ................ 361/502; 252/502
See application file for complete search history.

(56) References Cited

U.S. PATENT DOCUMENTS

| | | | | |
|---|---|---|---|---|
| 4,055,628 A | * | 10/1977 | McCarroll et al. | 423/448 |
| 5,591,545 A | * | 1/1997 | Miyashita et al. | 429/231.8 |
| 5,706,165 A | * | 1/1998 | Saito et al. | 361/502 |
| 5,908,584 A | * | 6/1999 | Bennett | 252/502 |
| 6,038,123 A | * | 3/2000 | Shimodaira et al. | 361/502 |
| 6,187,713 B1 | * | 2/2001 | Gadkaree | 502/425 |
| 6,225,733 B1 | * | 5/2001 | Gadkaree et al. | 313/352 |
| 6,350,520 B1 | * | 2/2002 | Nesbitt et al. | 428/408 |
| 6,511,645 B1 | * | 1/2003 | Nesbitt et al. | 264/604 |
| 6,544,648 B1 | * | 4/2003 | Nesbitt et al. | 428/408 |
| 6,547,990 B1 | * | 4/2003 | Shinozaki et al. | 252/502 |
| 6,660,583 B1 | * | 12/2003 | Fujino et al. | 438/253 |
| 6,660,680 B1 | * | 12/2003 | Hampden-Smith et al. | 502/180 |
| 6,721,168 B1 | * | 4/2004 | Takeuchi et al. | 361/502 |
| 6,738,252 B1 | * | 5/2004 | Okamura et al. | 361/502 |
| 6,808,845 B1 | * | 10/2004 | Nonaka et al. | 361/502 |

FOREIGN PATENT DOCUMENTS

JP 10079252 * 3/1998

OTHER PUBLICATIONS

"Industrial carbon adsorbents", Swiatkowski Studies in Surface Science and Catalysis (1999),□□120A (Adsorption and Its Applications in Industry and Environmental Protection, vol. 1), 69-94□□Abstract Only.*

"Structure of the active carbon made from bituminous coal and the mechanism of the vapor phase activation" Morioka et al. Nippon Kagaku Kaishi (1995), (1), 9-12.□□Abstract Only.*

Note: JP 252 to Takanishi et al. above is the full Japanese Patent Document pulled off the JPO Website.*

* cited by examiner

*Primary Examiner*—Paul Marcantoni
(74) *Attorney, Agent, or Firm*—Arent Fox PLLC

(57) ABSTRACT

A carbonized product 10 used for production of activated carbon for an electrode of an electric double-layer capacitor, includes a plurality of crystallites 12 each having a graphite structure in an amorphous carbon matrix 11. The interlayer distance $d_{002}$ of the crystallites 12 is set a value equal to or larger than 0.347 nm. Thus, by using this carbonized product, it is possible to produce activated carbon having a high electrostatic capacity density (F/cc) for an electrode of an electric double-layer capacitor.

6 Claims, 5 Drawing Sheets

CARBONIZED PRODUCT USED FOR PRODUCTION OF ACTIVATED CARBON FOR ELECTRODE OF ELECTRIC DOUBLE-LAYER CAPACITOR

BACKGROUND OF THE INVENTION

1. Field of the Invention

The present invention relates to a carbonized product used for production of activated carbon for an electrode of an electric double-layer capacitor.

2. Description of the Related Art

A conventional activated carbon for an electrode is produced by subjecting a carbonized product to an activating treatment, e.g., an alkali-activating treatment.

The alkali-activating treatment is a substantially established technique. To produce activated carbon for an electrode having a high electrostatic capacity density (F/cc), it is necessary to use a suitable carbonized product.

SUMMARY OF THE INVENTION

Accordingly, it is an object of the present invention to provide a carbonized product suitable for production of activated carbon for an electrode having a high electrostatic capacity density (F/cc).

To achieve the above object, according to the present invention, there is provided a carbonized product used for production of activated carbon for an electrode of an electric double-layer capacitor, which includes a plurality of crystallites each having a graphite structure in an amorphous carbon matrix, interlayer distance $d_{002}$ of the crystallites being equal to or larger than 0.347 nm ($D_{002} \geq 0.347$ nm).

When the carbonized product having the above-described structure is subjected to, for example, an alkali-activating treatment, the permeability of a molten alkali into the carbonized product is improved attributable to the relatively large interlayer distance $d_{002}$ of the carbonized product, and the discharge of a generated gas to the outside of the carbonized product is conducted quickly. Thus, activated carbon for an electrode having a high electrostatic capacity density (F/cc) can be stably produced by a constant alkali-activating treatment in each of lots. However, if the interlayer distance $d_{002}$ is smaller than 0.347 nm, it is difficult to stably produce the above-described activated carbon.

According to the present invention, there is also provided a carbonized product used for production of activated carbon for an electrode of an electric double-layer capacitor, which includes a plurality of crystallites each having a graphite structure in an amorphous carbon matrix, interlayer distance $d_{002}$ of the crystallites being equal to or larger than 0.350 nm ($D_{002} \geq 0.350$ nm).

When the carbonized product having the above-described structure is subjected to, for example, an alkali-activating treatment, the permeability of a molten alkali into the carbonized product is improved attributable to the relatively large interlayer distance $d_{002}$ of the carbonized product, and the discharge of a generated gas to the outside of the carbonized product is conducted further quickly. Thus, by the constant alkali-activating treatment in each of lots, the electrostatic capacity density (F/cc) of the activated carbon for the electrode can be increased and stabilized, and the mass-productivity of the activated carbon for the electrode can be improved.

In the above-described two carbonized products according to the present invention, it is preferable that the upper limit value of the interlayer distance $d_{002}$ is equal to 0.362 nm. Because, to ensure $d_{002} \geq 0.363$ nm, an oxygen-crosslinking treatment must be carried out for a long time to set the oxygen-crosslinking rate $D_L$ at a value higher than 10%, and even if such a means is employed, a remarkable increase in electrostatic capacity density (F/cc) of the activated carbon for the electrode is not observed, and on the other hand, a reduction in productivity is brought about.

DESCRIPTION OF THE PREFERRED EMBODIMENT

Figure 1:
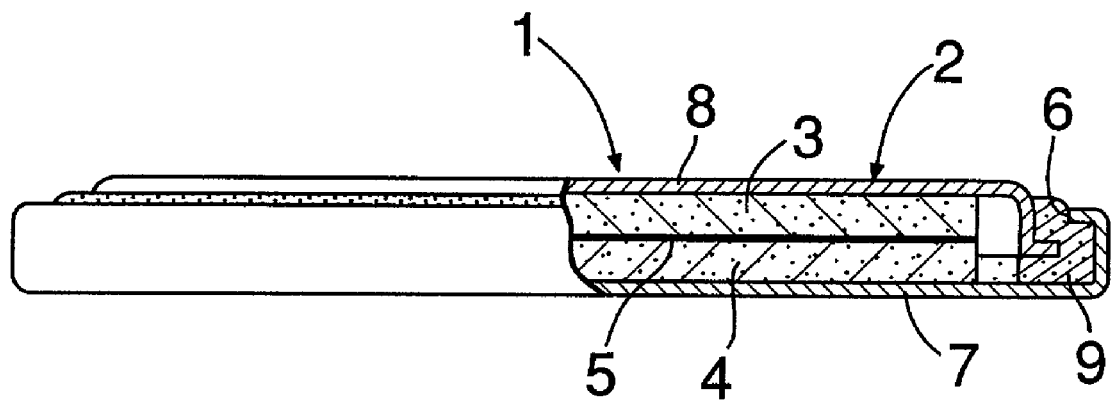
FIG. 1 is a broken-away front view of an essential portion of a button-type electric double-layer capacitor.

Referring to FIG. 1, a bottom-type electric double-layer capacitor 1 includes a case 2, a pair of polarized electrodes 3 and 4 accommodated in the case 2, a spacer 5 sandwiched between the polarized electrodes 3 and 4, and an electrolyte solution filled in the case 2. The case 2 comprises a body 7 made of aluminum and having an opening 6, and a lid plate 8 made of aluminum for closing the opening 6. An outer periphery of the lid plate 8 and an inner periphery of the body 7 are sealed from each other by a seal material 9. Each of the polarized electrodes 3 and 4 is made of a mixture comprising activated carbon for an electrode, a conductive filler and a binder.

The activated carbon for the electrode is produced by sequentially conducting a step of forming a carbon material into a fiber-shaped material by spinning, or forming a carbon material into a powdery material by pulverization; a step of subjecting the carbon material to an oxygen crosslinking treatment; a step of subjecting the oxygen-crosslinked carbon material to a carbonizing treatment to provide a carbonized product; a step of subjecting the carbonized product to a pulverizing treatment; a step of subjecting the pulverized carbonized product to an alkali-activating treatment; and a step of subjecting the resulting material to washing, filtering and drying treatments to provide activated carbon.

A graphitizing carbon material is used as the carbon material and corresponds to mesophase pitch, coke, petroleum pitch, a polyvinyl chloride, a polyimide, PAN or the like. When the graphitizing carbon material is mesophase pitch, it is preferable that the molecular weight M of the mesophase pitch is in a range of $200 \leq M \leq 2,000$, and the softening point $T_S$ of the mesophase pitch is in a range of $T_S \leq 350°$ C. To pulverize the carbon material, a ball mill, a jet mill, a high-speed rotation mill (e.g., a laboratory cutter mill) or the like is employed.

The oxygen crosslinking treatment is carried out to crosslink benzene rings of adjacent condensed polycyclic organic compounds to each other through oxygen in the carbon material. Thus, the carbon material can be carbonized in the carbonizing treatment without being molten, namely, the solid-phase carbonization can be realized to increase the interlayer distance $d_{002}$ between crystallites. If the carbon material is molten, the reorientation occurs and the condensation of mesogen concurrently occurs, so that the interlayer distance $d_{002}$ is decreased.

The oxygen-crosslinking rate $D_L$ is varied depending on the molecular structure of the carbon material, but if the weight of the carbon material before the oxygen-crosslinking treatment is represented by $W_1$, and the weight of the carbon material after the oxygen-crosslinking treatment is represented by $W_2$, the oxygen-crosslinking rate $D_L$ is represented by $D_L=\{(W_2-W_1)/W_1\}\times 100(\%)$. The oxygen-crosslinking rate $D_L$ is set in a range of $0.1\% \leq D_L \leq 10\%$. In this case, if $D_L \leq 0.1\%$, the meaning of the oxygen-crosslinking treatment carried out is lost. On the other hand, if $D_L > 10\%$, a reduction in productivity of the activated carbon for the electrode is brought about, as described above. To carry out the oxygen-crosslinking treatment in an oxygen gas current to achieve the oxygen-crosslinking rate $D_L$, a heating temperature T is set in a range of $140°$ C.$\leq$T$\leq 350°$ C., and a heating time t is set in a range of $10^{-3}$ hr$\leq$t$\leq 10$ hr. The heating temperature T is set based on the softening point $T_S$ of the carbon material. The oxygen-crosslinking treatment is carried out at a single stage or at a plurality of stages. Crosslinking agents which may be used are, for example, $P_2O_5$, quinone, hydroquinone and polymer substances produced from hydroquinone derivates, $NO_2$ and the like. Even if the oxygen-crosslinking treatment is not carried out, activated carbon can be produced. In place of the oxygen crosslinking, a sulfur crosslinking can be carried out. In this case, a crosslinking accelerator may be used.

The carbonizing treatment is carried out in an inert gas at a heating temperature T set in a range of $500°$ C.$\leq$T$\leq 1,000°$ C. for a heating time t set in a range of $10^{-3}$ hr$\leq$t$\leq 10$ hr. In this case, if the temperature-raising rate is increased in the temperature-raising process from $300°$ C. to $500°$ C., the interlayer distance $d_{002}$ of the carbon material can be increased. Therefore, the temperature-raising rate Rt is set at a value of Rt$\geq 200°$ C./hr. If Rt$<200°$ C./hr, the orientation is liable to occur in the carbonized product, and the interlayer distance $d_{002}$ becomes smaller.

Figure 2:
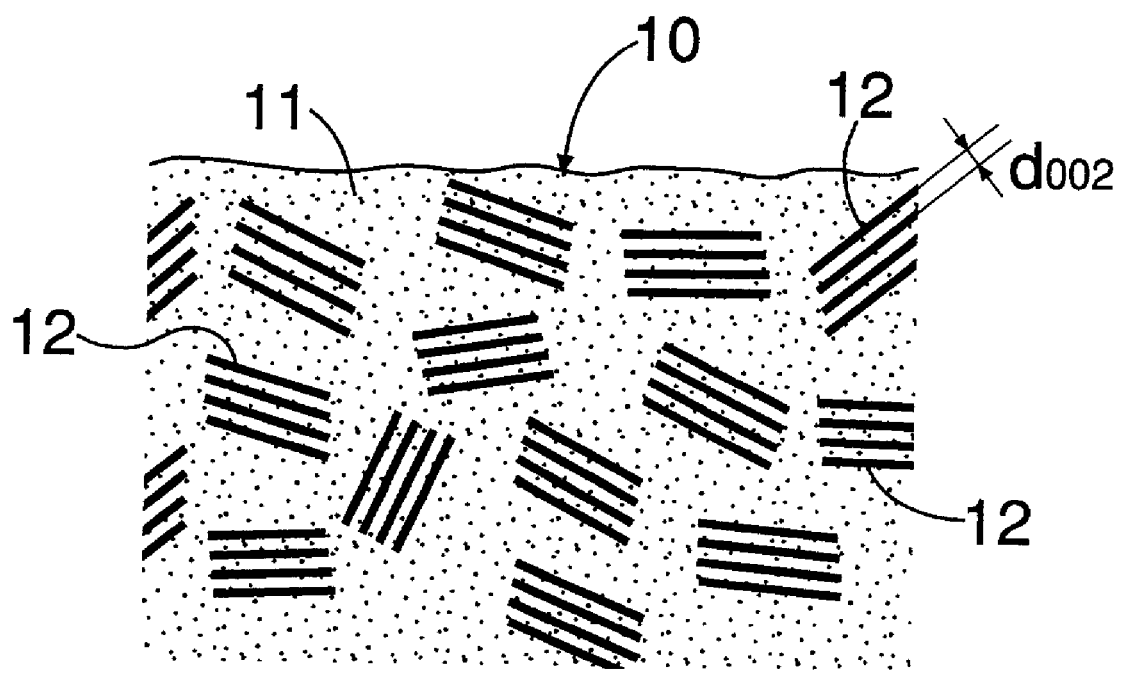
FIG. 2 is a diagram for explaining the structure of a carbonized product.
Figure 3:
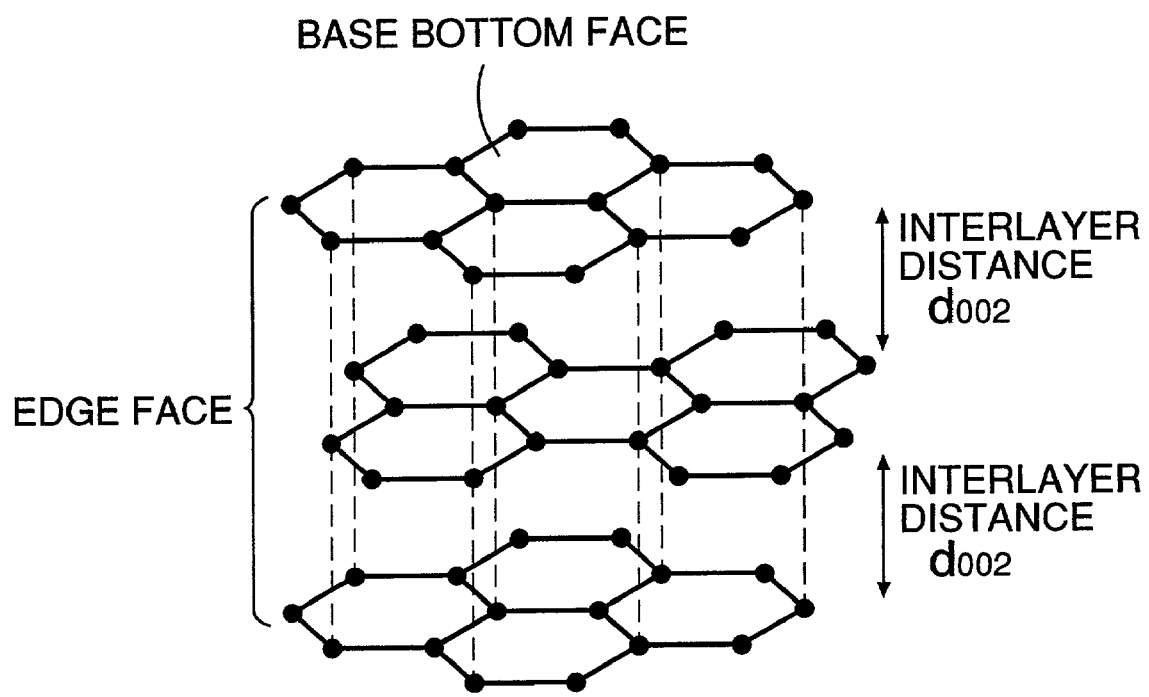
FIG. 3 is a diagram for explaining the structure of graphite.

This carbonizing treatment produces a carbonized product 10 shown in FIGS. 2 and 3, i.e., a carbonized product 10 having a plurality of crystallites 12 each of which has a graphite structure in an amorphous carbon matrix 11 and the interlayer distance $d_{002}$ of which is equal to or larger than 0.347 nm ($d_{002} \geq 0.347$ nm). The carbonized product has a true density d in a range of 1.3 g/cc$\leq$d$\leq 1.9$ g/cc. The fact that the carbonized product has such a true density d is effective for conducting the constant alkali activating treatment in the carbonized product.

In the pulverizing treatment, a pulverizer such as a ball mill, a jet mill, a high-speed rotation mill (e.g., a laboratory cutter mill) and the like is used. The powdery carbonized product has a particle size set in a range of 1 μm$\leq$DM$\leq 25$ μm terms of a median diameter Dm. By carrying out such sizing, the efficiency of the alkali-activating treatment can be improved.

Figure 4:
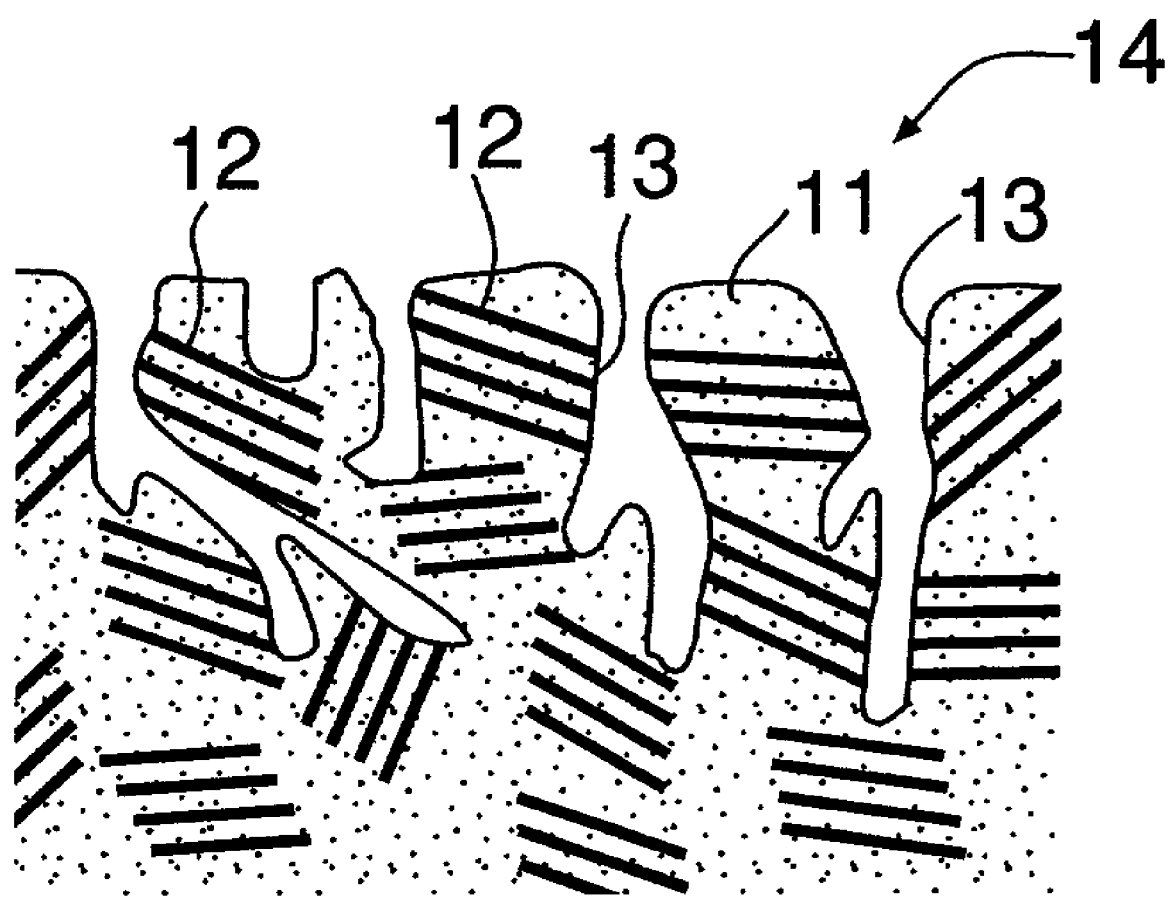
FIG. 4 is a diagram for explaining the structure of activated carbon for an electrode.

Potassium hydroxide (KOH) is used as a treating agent in the alkali-activating treatment for the powdery carbonized product. In the alkali-activating treatment in an inert gas atmosphere, a heating temperature T is set in a range of $500°$ C.$\leq$T$\leq 760°$ C. [lower than a boiling point of potassium (about $760°$ C.)], and a treating time t is set in a range of $10^{-3}$ hr$\leq$t$\leq 10$ hr. By carrying out the above-described operations after the alkali activation, activated carbon 14 for an electrode having a large number of pores 13 in an amorphous carbon matrix 11, as shown in FIG. 4, is produced. Prior to the alkali-activating treatment, a heating treatment may be carried out as required at a heating temperature T set in a range of $400°$ C.$\leq$T$\leq 450°$ C. and for a heating time t set in a range of $10^{-1}$ hr$\leq$t$\leq 10$ hr for the purpose of dehydration.

Particular examples will be described below.

(I) Selection of Carbon Material

Mesophase pitch having a softening point $T_S$ equal to $180°$ C. was selected as a first carbon material from mesophase pitches having softening points $T_S$ in a range of $130°$ C.$<T_S \leq 200°$ C. Mesophase pitch having a softening point $T_S$ equal to $240°$ C. was selected as a second carbon material from mesophase pitches having softening points $T_S$ in a range of $200°$ C.$<T_S \leq 250°$ C. Mesophase pitch having a softening point $T_S$ equal to $260°$ C. was selected as a third carbon material from mesophase pitches (made by Mitsubishi Gas Chemistries and having an MPL grade) having softening points $T_S$ in a range of $250°$ C.$\leq T_S < 290°$ C. Further, three types of MPM-BO, MPM-BL and MPM-BH were selected as a fourth carbon material from meso-carbon-pitch micro-powders (MPM made by Adchemco) which are commercially available petroleum pitches. The three MPM materials resulting from an oxygen-crosslinking treatment are commercially available.

(II) Production of Carbonized Product (a) Ten grams of a first massive carbon material was pulverized by a laboratory cutter mill to provide a first powdery carbon material having an average particle size of about 0.5 mm. (b) The first powdery carbon material was spread on an upper surface of a retaining plate within an oven so that the material could easily contact oxygen, and air was then supplied at 10 L/min into the oven to carry out an oxygen-crosslinking treatment under conditions of a temperature-raising rate of $1°$ C./min, a temperature of $130°$ C. and a retention time of 4.5 hours. Thereafter, an oxygen-crosslinking rate $D_L$ of the first powdery carbon material was determined. (c) The first powdery carbon material resulting from the oxygen-crosslinking treatment was placed into a carbonizing furnace where a carbonizing treatment was carried out in a nitrogen gas current under conditions of a temperature-raising rate of $200°$ C./hr, a temperature of $700°$ C. and a retention time of 1 hour to provide a carbonized product. (d) The carbonized product was subjected to a pulverizing treatment using a laboratory cutter mill to provide a powdery carbonized product having a median diameter Dm equal to 25 μm. This carbonized product is called Example (1).

Then, Examples (2) to (20) were produced under producing conditions different from those for Example (1). Table 1 shows the conditions in production of Examples (2) to (20). The production conditions of Example (1) are also shown in Table 1.

TABLE 1

| Carbonized product | Carbon material | Oxygen-crosslinking treatment | Carbonizing treatment |
|---|---|---|---|
| Example (1) | 1st carbon material | Not treated | $20°$ C./hr; $650°$ C. - 1 hr |
| Example (2) | | $1°$ C./min; $140°$ C. - 3 hr, $170°$ C. - 3 hr, | $20°$ C./hr; $650°$ C. - 1 hr |
| Example (3) | | $1°$ C./min; $130°$ C. - 6 hr | |
| Example (4) | | $1°$ C./min; $130°$ C. - 4.5 hr | $200°$ C./hr; $700°$ C. - 1 hr |
| Example (5) | 2nd carbon material | Not treated | $20°$ C./hr; $700°$ C. - 1 hr |
| Example (6) | | | $200°$ C./hr; $650°$ C. - 1 hr |

TABLE 1-continued

| Carbonized product | Carbon material | Oxygen-crosslinking treatment | Carbonizing treatment |
|---|---|---|---|
| Example (7) | | | 200° C./hr; 700° C. - 1 hr |
| Example (8) | | 2° C./min; 200° C. - 6 hr | |
| Example (9) | | 2° C./min; 200° C. - 3 hr 250° C. - 3 hr | 900° C./hr; 700° C. - 1 hr |
| Example (10) | 3rd carbon material | Not treated | 20° C./hr; 700° C. - 1 hr |
| Example (11) | | | 900° C./hr; 750° C. - 1 hr |
| Example (12) | | | 200° C./hr; 700° C. - 1 hr |
| Example (13) | | 2° C./min; 250° C. - 3 hr | 900° C./hr; 750° C. - 1 hr |
| Example (14) | | 3° C./min; 300° C. - 3 hr | 200° C./hr; 700° C. - 1 hr |
| Example (15) | | 5° C./min; 280° C. - 6 hr | 200° C./hr; 750° C. - 1 hr |
| Example (16) | | 3° C./min; 300° C. - 6 hr | 200° C./hr; 700° C. - 1 hr |
| Example (17) | | 3° C./min; 300° C. - 20 hr | |
| Example (18) | 4th carbon material | MPM-BO oxygen-crosslinked | 20° C./hr; 700° C. - 1 hr |
| Example (19) | | MPM-BL | 200° C./hr; 700° C. - 1 hr |
| Example (20) | | MPM-BH | |

Conditions which are described with regard to the production of Example (1) and which are not shown for Examples (2) to (20) in Table 1 and not yet described, are the same as those in the production of Example (1).

(III) Measurement of Interlayer Distance $d_{002}$ for Carbonized Product

An interlayer distance $d_{002}$ of crystallites in each of Examples (1) to (20) of the carbonized products was determined by an X-ray diffraction measurement. More specifically, each of Examples (1) to (20) was dried and charged into a recess having a length of 25 mm and a width of 25 mm in a glass cell, to prepare a sample. The sample was placed into an X-ray diffraction device (MXP18 made by Mack Science).

Then, a step scanning process was carried out under the following conditions to provide an X-ray diffraction pattern: range of measuring angle: 15 to 30 deg. in terms of 2θ; target: Cu; lamp voltage: 40 kV; lamp current: 100 mA; step width: 0.05 deg.; counting time: 1.0 sec. Thereafter, the X-ray diffraction pattern was analyzed under the following conditions: noise condition: half-width: 0.5 deg.; noise level: 5.0; peak analysis: differentiated number of points of 20.0.

An interfacial distance d was determined from an analyzed diffraction curve peak, and defined as an interlayer distance $d_{002}$.

(IV) Alkali-Activating Treatment (a) Ten grams of Example (1) of the carbonized product and a KOH pellet having a purity of 85% in an amount two times the amount of Example (1) by weight were mixed together sufficiently, and the mixture was then charged into a boat made of nickel. (b) The boat was placed into a tubular furnace, where it was retained at a temperature-raising rate of 200° C./hr and at 450° C. for 3 hours and then retained at 730° C. for 3 hours. Subsequently, the boat was removed from the tubular furnace and subjected to a removal of KOH by the HCL cleaning of the treated powder, a washing by warm water, a filtration and a drying to provide activated carbon for an electrode having an average particle size of 15 μm.

The activated carbon for the electrode produced in the above manner is called Example (1) for convenience. Then, Examples (2) to (20) of the carbonized products were used and subjected to an alkali-activating treatment under the same conditions as those described above to produce examples (2) to (20) of activated carbons for electrodes corresponding to Examples (2) to (20) of the carbonized products.

(V) Fabrication of Button-Type Electric Double-Layer Capacitor

Example (1) of the activated carbon for the electrode, a graphite powder (a conductive filler) and PTFE (a binder) were weighed so that a weight ratio of 90:5:5 was obtained. Then, the weighed materials were kneaded together, and the kneaded mixture was then subjected to a rolling, thereby fabricating an electrode sheet having a thickness of 185 μm. Two polarized electrodes 3 and 4 each having a diameter of 20 mm were cut from the electrode sheet, and a button-type electric double-layer capacitor 1 shown in FIG. 1 was fabricated using the two polarized electrodes 3 and 4, a spacer 5 made of PTFE and having a diameter of 20 mm and a thickness of 75 μm, an electrolyte solution and the like. A solution of 1.8 M triethylmethyl ammonium.tetrafluoroborate $[(C_2H_5)_3CH_3NBF_4]$ in propylene carbonate was used as the electrolyte solution. Nineteen button-type electric double-layer capacitors were fabricated in the same manner as described above using Examples (2) to (20).

(VI) Electrostatic Capacity Density of Activated Carbon for Electrode

Each of the button-type electric double-layer capacitors was subjected to a charging/discharging cycle which will be described below, and an electrostatic capacity density per unit volume (F/cc) of each of the activated carbons for the electrodes was then determined by an energy conversion process. In the charging/discharging cycle, the charging for 90 minutes and the discharging for 90 minutes were conducted once at 2.7 V, once at 2.8 V, once at 3.0 V and once at 2.7 V.

Table 2 shows the oxygen-crosslinking rate $D_L$ of the carbon material for Examples (1) to (20) of the activated carbon, the interlayer distance $d_{002}$ and the electrostatic capacity density (F/cc) at 2.7 V for the carbonized product.

TABLE 2

| Activated carbon for electrode | Oxygen-crosslinking rate $D_L$ of carbon material (%) | Interlayer distance $d_{002}$ for carbonized product (nm) | Electrostatic capacity density of activated carbon for electrode (F/cc) |
|---|---|---|---|
| Example (1) | 0 | 0.344 | 10.0 |
| Example (2) | 0.1 | 0.345 | 13.2 |
| Example (3) | 0.1 | 0.345 | 21.6 |
| Example (4) | 0.1 | 0.347 | 35.6 |
| Example (5) | 0 | 0.340 | 8.0 |
| Example (6) | 0 | 0.342 | 9.5 |
| Example (7) | 0 | 0.345 | 9.2 |
| Example (8) | 3.0 | 0.348 | 31.6 |
| Example (9) | 6.7 | 0.350 | 33.5 |
| Example (10) | 0 | 0.342 | 10.0 |
| Example (11) | 0 | 0.345 | 30.1 |
| Example (12) | 0 | 0.346 | 26.8 |
| Example (13) | 3.4 | 0.350 | 34.9 |
| Example (14) | 6.4 | 0.350 | 32.8 |

TABLE 2-continued

| Activated carbon for electrode | Oxygen-crosslinking rate $D_L$ of carbon material (%) | Interlayer distance $d_{002}$ for carbonized product (nm) | Electrostatic capacity density of activated carbon for electrode (F/cc) |
| --- | --- | --- | --- |
| Example (15) | 8.0 | 0.354 | 33.5 |
| Example (16) | 10.0 | 0.362 | 33.5 |
| Example (17) | 30.0 | 0.363 | 33.0 |
| Example (18) | 0.1 | 0.340 | 7.0 |
| Example (19) | 2.5 | 0.346 | 28.0 |
| Example (20) | 3.8 | 0.350 | 31.1 |

Figure 5:
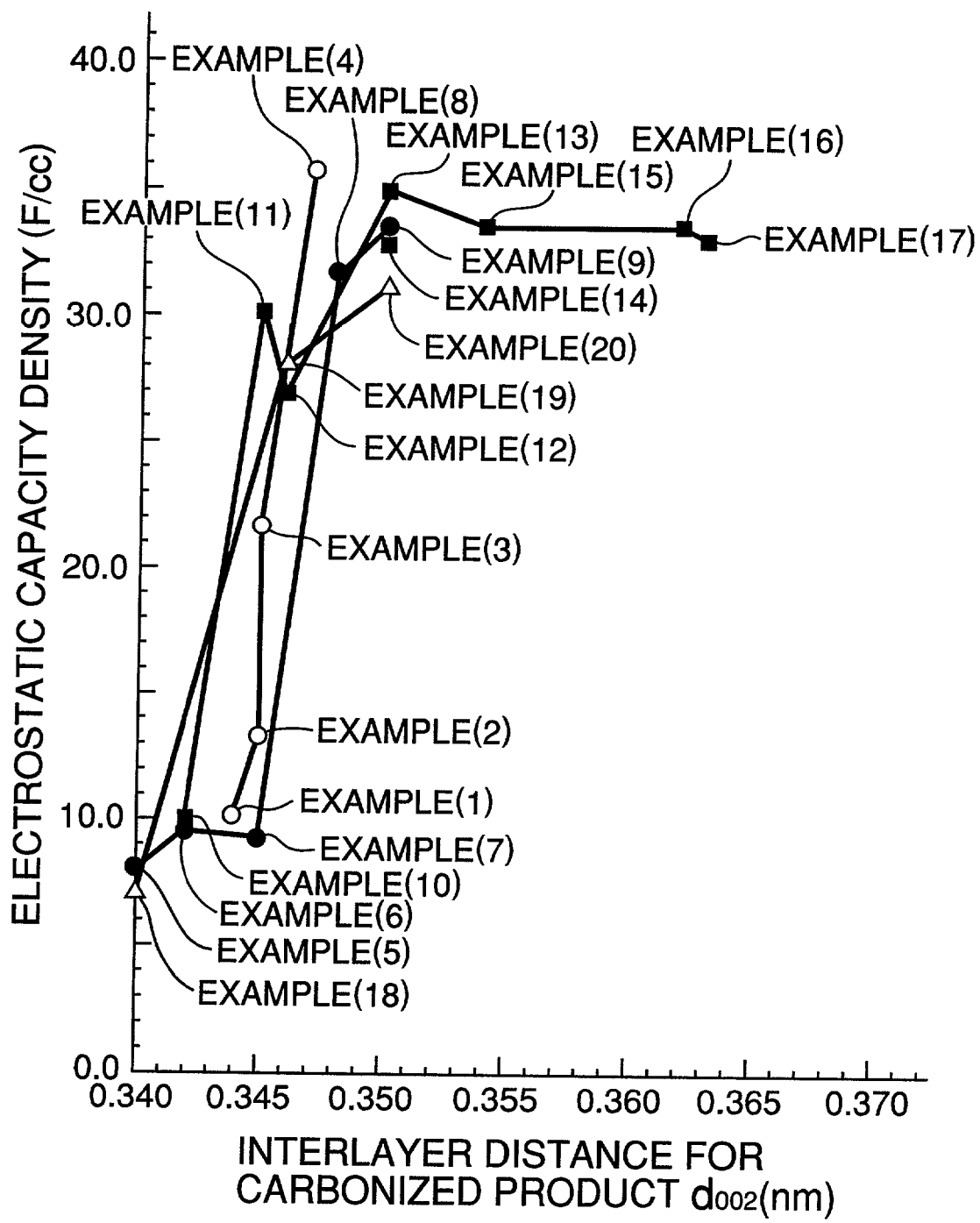
FIG. 5 is a graph showing the relationship between the interlayer distance $d_{002}$ for the carbonized product and the electrostatic capacity density (F/cc) per unit volume.

FIG. 5 is a graph based on Table 2 and showing the relationship between the interlayer distance $d_{002}$ for the carbonized product and the electrostatic capacity density (F/cc). As apparent from Table 2 and FIG. 5, if the interlayer distance $d_{002}$ for the carbonized product is set at a value equal to or larger than 0.347 nm, as in Examples (4), (8), (9), (13) to (17) and (20), the electrostatic capacity density (F/cc) of the activated carbon for the electrode can be increased. If the interlayer distance $d_{002}$ is set at a value equal to or larger than 0.350 nm, the electrostatic capacity density (F/cc) of the activated carbon for the electrode can be increased and stabilized, whereby the mass-productivity of the activated carbon for the electrode can be improved.

In the embodiment, to produce excellent activated carbon for an electrode as described above, the oxygen-crosslinking rate $D_L$ of the carbon material is set at a value equal to or higher than 0.1% ($D_L \geq 0.1\%$), and in the carbonizing treatment, the temperature-raising rate Rt is set at a value equal to or higher than 200° C./hr; the heating temperature T is set at a value equal to or higher than 700° C., and the heating time t is set at a value equal to or larger than 1 hour, as shown in Tables 1 and 2.

What is claimed is:

1. A carbonized product used for production of alkali-activated carbon for an electrode of an electric double-layer capacitor, said carbonized product consisting of an amorphous carbon matrix and a plurality of crystallites in said matrix, each said crystallite having a graphite structure, interlayer distance $d_{002}$ of the crystallites being in the range of 0.347 nm $\leq d_{002} \leq$ 0.362 nm.

2. A carbonized product used for production of alkali-activated carbon for an electrode of an electric double-layer capacitor, said carbonized product consisting of an amorphous carbon matrix and a plurality of crystallites in said matrix, each said crystallite having a graphite structure, interlayer distance $d_{002}$ of the crystallites being in the range of 0.350 nm $\leq d_{002} \leq$ 0.362 nm.

3. The carbonized product of claim 1, wherein the interlayer distance $d_{002}$ of the crystallites is in the range of 0.347 nm $\leq d_{002} \leq$ 0.354 nm.

4. The carbonized product of claim 1, wherein the interlayer distance $d_{002}$ of the crystallites is in the range of 0.350 nm $\leq d_{002} \leq$ 0.354 nm.

5. The carbonized product of claim 1, wherein the carbonized product has true density d in a range of 1.3 g/cc $\leq$ d $\leq$ 1.9 g/cc.

6. The carbonized product of claim 1, wherein the carbonized product has a particle size set in a range of 1 µm $\leq$ DM $\leq$ 25 µm.

* * * * *